US012809329B2

(12) United States Patent
Hog et al.

(10) Patent No.: US 12,809,329 B2
(45) Date of Patent: Nov. 24, 2026

(54) METHOD FOR OPERATING A SEGMENT OF CYCLE-ORIENTED CONTROL SOFTWARE

(71) Applicant: Siemens Aktiengesellschaft, Munich (DE)

(72) Inventors: Ronny Hog, Kuemmersbruck (DE); Julia Schweiger, Hirschau (DE); Sebastian Schötz, Hahnbach (DE); Markus Walter, Bamberg (DE)

(73) Assignee: Siemens Aktiengesellschaft, Munich (DE)

( * ) Notice: Subject to any disclaimer, the term of this patent is extended or adjusted under 35 U.S.C. 154(b) by 201 days.

(21) Appl. No.: 18/898,065

(22) Filed: Sep. 26, 2024

(65) Prior Publication Data

US 2025/0110465 A1 Apr. 3, 2025

(30) Foreign Application Priority Data

Sep. 28, 2023 (EP) .................................... 23200351

(51) Int. Cl.
*G05B 19/05* (2006.01)
*G06F 7/58* (2006.01)

(52) U.S. Cl.
CPC ............. *G05B 19/05* (2013.01); *G06F 7/588* (2013.01); *G05B 2219/15126* (2013.01)

(58) Field of Classification Search
CPC .......... G05B 19/05; G05B 2219/15126; G05B 19/0428; G05B 9/02; G06F 7/588; G06F 1/14
See application file for complete search history.

(56) References Cited

U.S. PATENT DOCUMENTS

| | | | | |
|---|---|---|---|---|
| 10,048,670 | B2 * | 8/2018 | Wang | G05B 19/418 |
| 10,111,679 | B2 * | 10/2018 | Baber | A61B 17/07207 |
| 2011/0035524 | A1 | 2/2011 | Kydles et al. | |
| 2011/0185217 | A1 | 7/2011 | Eyermann et al. | |
| 2021/0278816 | A1 * | 9/2021 | Schweiker | G06F 13/12 |

FOREIGN PATENT DOCUMENTS

| | | |
|---|---|---|
| DE | 102018120347 | 2/2020 |
| EP | 2241953 | 10/2010 |
| EP | 2284771 | 2/2011 |

* cited by examiner

*Primary Examiner* — Kenneth M Lo
(74) *Attorney, Agent, or Firm* — Cozen O'Connor

(57) ABSTRACT

Method for operating a segment of cycle-oriented control software, wherein to test, in a virtual control system, execution of a cold start mechanism, on a start-up of a runtime environment, a random number is generated, stored in a storage region and added to the storage region upon every further request for a safety time, where at the start of a new cycle, the deviation of the time differences is calculated and, in each cycle, the storage region is accessed and before calculation of the time differences, the random number is re-subtracted from the safety time, when a new start-up of the runtime environment has occurred, this is diagnosable via the tolerance being exceeded, because the second time difference now has an offset that results from the safety time with a new random number of the current cycle and the safety time with the old random number of the previous cycle.

15 Claims, 6 Drawing Sheets

METHOD FOR OPERATING A SEGMENT OF CYCLE-ORIENTED CONTROL SOFTWARE

BACKGROUND OF THE INVENTION

1. Field of the Invention

The invention relates to method for operating a piece of cycle-oriented control software for controlling a process.

2. Description of the Related Art

Control systems that are commonplace nowadays are based upon a hardware platform, a special electronic substructure, specifically a programmable logic controller (PLC). Where, in recent times, virtual control systems or software control systems come into consideration, a hardware system for their execution is also required, although the hardware can now be completely abstracted. This means that the soft PLC being executed no longer needs to the device upon which it is running.

As before, these devices can be dedicated control devices, such as multifunctional control platforms, industrial PCs or even edge computing platforms. Increasingly, however, they are to be found in control networks of machine operators and systems operators, or even cloud computing platforms are made use of. What is decisive is the abstraction of the hardware by containers or hypervisors. The soft PLC is “deployed” thereon using standard means or is orchestrated using a tool, where an installation, as in the case of software-based control, is no longer needed.

The invention belongs within the specialist domain of safety-oriented control systems, in particular as software. Programmable logic controllers must be configured in accordance with the requirements of the norm EN 61508 such that they fulfil a functional safety standard. In safety-oriented systems, such as programmable logic controllers for critical processes that contain electrical, electronic or programmable electronic components, the failure of which poses a significant risk to persons or the environment, they must be configured to guarantee a particular degree of safety. Examples of applications that require enhanced safety are the following: nuclear power stations, control technology for systems of significance in safety technology, railway applications, telecommunications technology, signaling technology and data processing systems, chemical processes, and also, for example, small systems such as a punching machine for punching out sheet metal parts.

With current fail-safe control systems (for example, SIMATIC S7-1511 F), it must be ensured, during a start-up after a mains off/on and/or stop/run transition, that the starting up always occurs with the initial values and not with the current values of the last safety program cycle (for example, before the mains off) (referred to below as a cold start).

EP 2 284 771 B1 and EP 2 241 953 B1 describe that in each cycle of a fail-safe control system, a safe time is formed from two timers (standard timer and fail-safe timer, or F timer). This is achieved by the formation of the time difference between two cycles (S-Diff and F-Diff) and subsequent comparison of the time differences with a pre-determined tolerance.

SUMMARY OF THE INVENTION

It is an object of the invention to provide a method for operating a segment of cycle-oriented control software for controlling a process, wherein the control software is caused to execute on a computer system within a runtime environment, where in order to secure a system time of the computer system, a further safety time independent of the system time is requested in each cycle, and where a first time difference is formed from the system time of the current cycle and the system time of the previous cycle and a second time difference is formed from the safety time of the current cycle and the safety time of the previous cycle and a comparison of the time differences with a pre-determined tolerance is carried out and, in the event that the deviation of the time differences exceeds the tolerance, an error signal is generated.

Thus, the elapsed time between the current and the previous cycle is established via the difference between the two timers.

The difference of the standard timer is given by SDIFF=S_TIM−S_TIM_ALT and the difference of the F timer is given by FDIFF=F_TIM_ALT−F_TIM, and preferably, it is possible to work here with a backward-running counter.

Using a forward-running counter, the old time can also be subtracted from the new time.

Subsequently, a check is performed to determine whether the established difference values lie within the permitted tolerance range.

With conventional fail-safe control systems, the behavior of the two timers in the “mains off” state was known because both the timers were situated on one device and were defined by the manufacturer of fail-safe control systems.

With the introduction of a virtual software control system (soft-PLC), the second time is retrieved from an external time source and thus has an undefined behavior during a “mains off”.

It is also an object of the present invention to ensure the safety of a system with a virtual control system.

These and other objects and advantages are achieved in accordance with the invention where, upon a start-up of the runtime environment, a random number is generated, this random number is stored in a storage region and, upon every further request for the safety time, the generated random number is added to the requested safety time, where at the start of a new cycle in the control software, the deviation between the time differences is calculated in a control component, and in each cycle the storage region is accessed by the control component and, before the calculation of the time differences, the random number is subtracted out of the safety time in the control component again, for the eventuality that a new start-up of the runtime environment has occurred. This can be diagnosed upon the tolerance being exceeded, because the second time difference now has an offset which is given by the safety time with a new random number of the current cycle and the safety time with the old random number of the previous cycle.

A method now therefore exists for recognizing whether, during a start-up after a mains off/on, it is ensured that the starting up always occurs with the initial values and not with the current values of the last safety program cycle (for example, before the mains off). This is because when the mains fails, the computer system also drops out and when the mains returns, the runtime environment is started up again, although thereby the control software is started anew, now there is the assurance that in the safety program, the cold start mechanism has also been performed.

If the cold start mechanism is functioning, then the random number is subtracted out in the difference calculation from the second cycle onward.

If the cold start mechanism fails, then the calculation is performed with two different random numbers in the first cycle (for example, once with the random number before "mains off" and once with the new random number after "mains on") and thus the execution of the safety program is stopped.

The control software is operated as a fail-safe control system with a safety program and a standard user program and unwanted influencing of the safety program can be revealed.

The cold start mechanism is implemented on the computer system during a start-up of the fail-safe control system after a power failure and it is ensured by the cold start mechanism that the start-up always occurs with initial values and not with current values from the last cycle, where in the event that the cold start mechanism has failed, this is recognized during the difference calculation in the control component when the tolerance is exceeded, so that a failure of the cold start mechanism is recognized.

The safety time is read out by a hardware component installed in the computer system, in particular by a network card. After the request for the safety time, this is converted to an integer value in that a standard frequency of 32.768 kHz is replicated.

No intervention of any kind is made into the formation of the standard times. Two mutually independent timers operate and each is generated by a different quartz crystal.

TABLE 1

| | The standard timer | The F timer |
|---|---|---|
| Timer type | Base timer of the system quartz crystal derived via interrupts | HW timer derived from NIC |
| Frequency | 1 kHz (1 ms) | 32.768 kHz (ca. 30.518 μs) |
| Counter type | 32-bit forward counter | 32-bit backward counter |
| Quartz crystal | System quartz | NIC quartz |
| Remanence behavior | Remanent counter | Remanent counter, offset at start of the application/mains ON by one value which is newly randomly generated for the application at each start. The random number can be determined with a random number generator. |

The task is also allowed to run by a computer system comprising a runtime environment, configured as a segment of cycle-oriented control software for control of a process as a fail-safe control system, a random number generator, a processor with a system time, a hardware component with an external time source for providing a safety time, and a storage region, where the computer system is configured to implement the inventive method.

In an advantageous manner, the computer system is configured as a multifunctional control platform or as an industrial PC or as an edge computing platform or a cloud computing platform.

On the computer system, the control software is configured as a fail-safe control system with a safety program and a standard user program.

The fail-safe control system has a cold start mechanism that is configured to perform a start-up of the fail-safe control system after a power failure on the computer system, where the cold start mechanism is configured to pre-configure the fail-safe control system with initial values and not with current values of the last cycle, and further includes a control component configured to recognize a failure of the cold start mechanism via the difference calculation based on the tolerance being exceeded.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawings show an exemplary embodiment, in which.

DETAILED DESCRIPTION OF THE EXEMPLARY EMBODIMENTS

Figure 1:
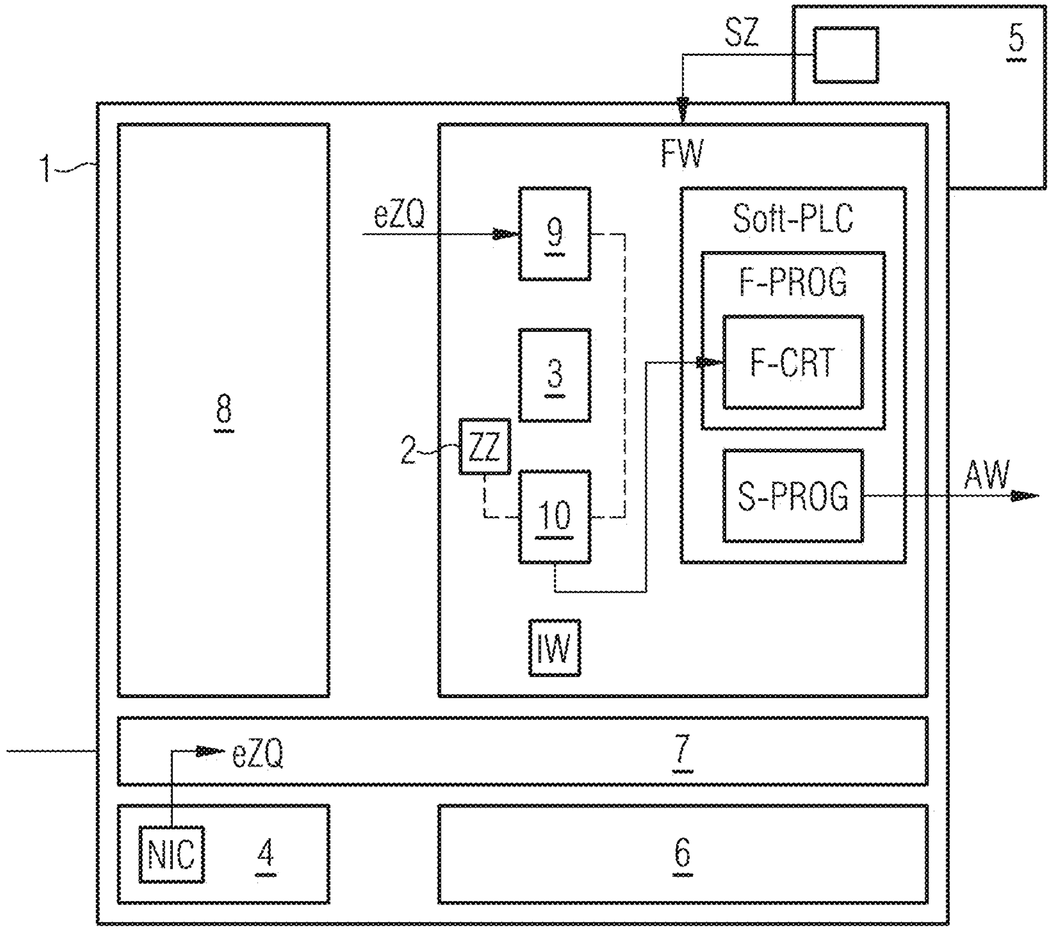
FIG. 1 shows a computer system on which a runtime environment for a piece of control software is accommodated in accordance with the invention.

With reference to FIG. 1, shown therein is a computer system 1, which can be, for example, an industrial PC or an edge computing platform. In the computer system 1, a hypervisor 7 is installed that enables an operating system 8, for example, a Windows operating system, to be operated alongside a runtime environment FW. The runtime environment FW is configured to cause a segment of cycle-oriented control software SOFT-PLC to execute to control a process as a fail-safe control system. The control software SOFT-PLC is equipped with a safety program F-PROG and with a standard application program S-PROG. For the fail-safe control system F-CPU, it is necessary that to secure a system time SZ of the computer system 1, a further independent safety time eZQ independent of the system time SZ is requested in each cycle Z.

A processor 5 of the computer system makes the system time SZ available. The safety time eZQ is read out by a hardware component 4, in particular a network card NIC installed in the computer system 1. A requestor 9 in the runtime environment FW provides for a continual requesting of the safety time eZQ. In order to secure the system time SZ, a first time difference S-Diff is formed from the system time SZ of the previous cycle Zn−1 and a second time difference F-Diff is formed from the safety time eZQ of the current cycle and the safety time eZQ of the previous cycle Zn−1. A comparison of the time differences S-Diff, F-Diff is performed with a predetermined tolerance TOL and, in the event that the deviation of the time differences S-Diff, F-Diff exceeds the tolerance TOL, an error signal is generated.

Thus, the elapsed time between the current and the previous cycle is now established via the differences between the two timers. In order now to recognize whether during a start-up after a mains off/on, it is ensured that the starting up always takes place with the initial values IW and not with the current values AW of the last safety program cycle (for example before the mains off), during a start-up of the runtime environment FW, a random number ZZ is generated. This random number ZZ is stored in a storage region 2 and, upon every further request of the safety time eZQ, the random number ZZ is added to the storage region 2. At the start of a new cycle Zn in the control software Soft-PLC, in a control component F-CRT, the storage region 2 is accessed and before the calculation of the time differences S-Diff, F-Diff, the random number ZZ is again subtracted out of the safety time eZQ in the control component F-CRT. The random number ZZ is generated via the random number generator 3. The converter 10 provides for the addition of the random number ZZ to the externally requested safety time eZQ.

With the fail-safe control system of the prior art, it has previously always been possible to ensure that the behavior of the two timers in the "mains off" state is different, because both were situated on one device and the timers were defined by the manufacturer.

If, however, it is desired to realize a control with a piece of control software Soft-PLC on any desired platform, then the second time can be retrieved, for example, from a network card NIC, but this network card NIC has an undefined behavior during a "mains off". In order further to ensure a failure of a cold start mechanism KM, with this solution, the random number ZZ is added to the value of the safety time eZQ. This random number ZZ is formed once on each start-up, for example, after a power failure.

When the cold start mechanism KM is functioning, during the difference calculation of the times, the random number ZZ is subtracted out, if the cold start mechanism KM has failed. The calculation occurs with two different random numbers ZZ in the cycle Z, once with the random number ZZ before a "mains off" and once with the new random number ZZ after a "mains on". The execution of the safety program F-PROG can therefore be stopped, because this is an indicator that the cold start mechanism KM has failed and the current values AW have not been reset to initial values IW.

The computer system 1 also has additional reserved hardware 6 specifically for the fail-safe control system F-CPU.

Figure 2:
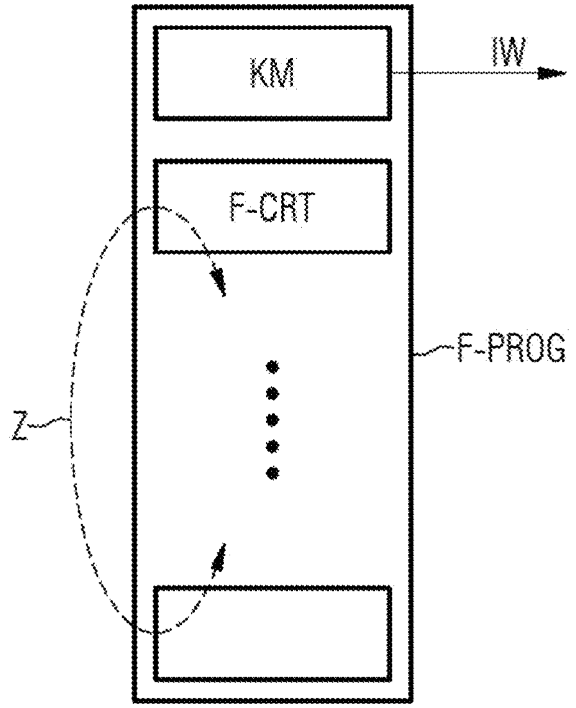
FIG. 2 shows a safety program with a cold start mechanism in accordance with the invention.

In FIG. 2, it is made clear that at the start of a safety program F-PROG, a cold start mechanism KM is performed that resets the current values AW to initial values IW. With each cycle Z in the safety program F-PROG, the time is recalculated via the control component F-CRT.

Figure 3:
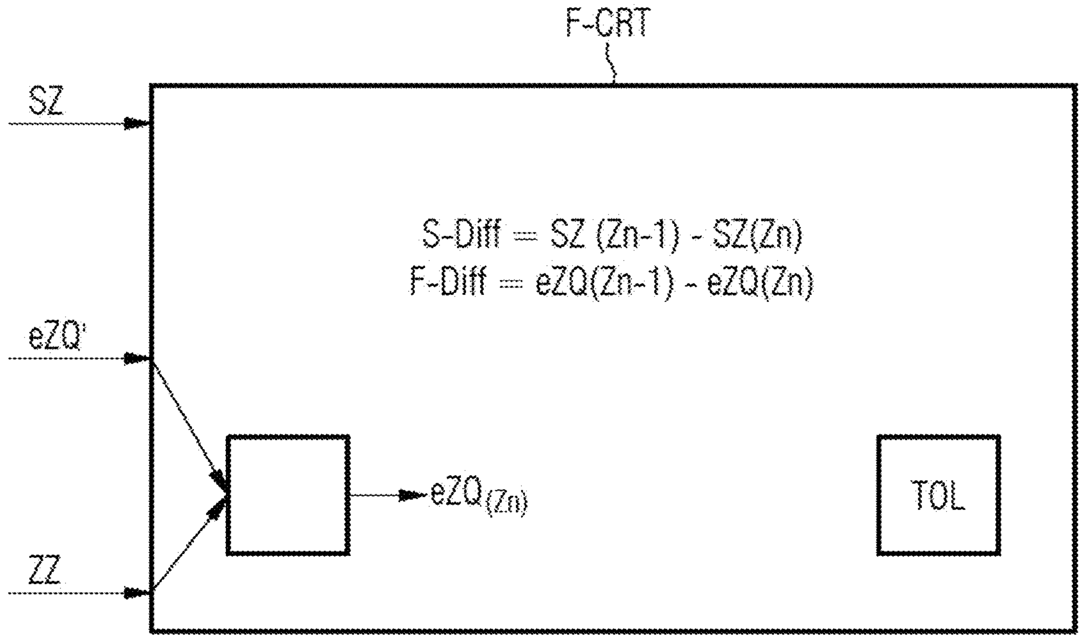
FIG. 3 shows a control component for difference calculation of times in accordance with the invention.

FIG. 3 shows the time calculation algorithm implemented in the control component F-CRT. The control component F-CRT receives, as input variables, the system time SZ, the random number ZZ from the storage region 2 and the safety time eZQ converted with the converter 10 to a safety time eZQ' into which the random number ZZ is added. In the control component F-CRT, however, the random number ZZ is subtracted out again from the safety time eZQ' and the safety time eZQ (Zn) is obtained. Now, the differences S-Diff and F-Diff of the respective old and new time are formed. If the differences exceed a tolerance TOL, then an error signal is generated.

Figure 4:
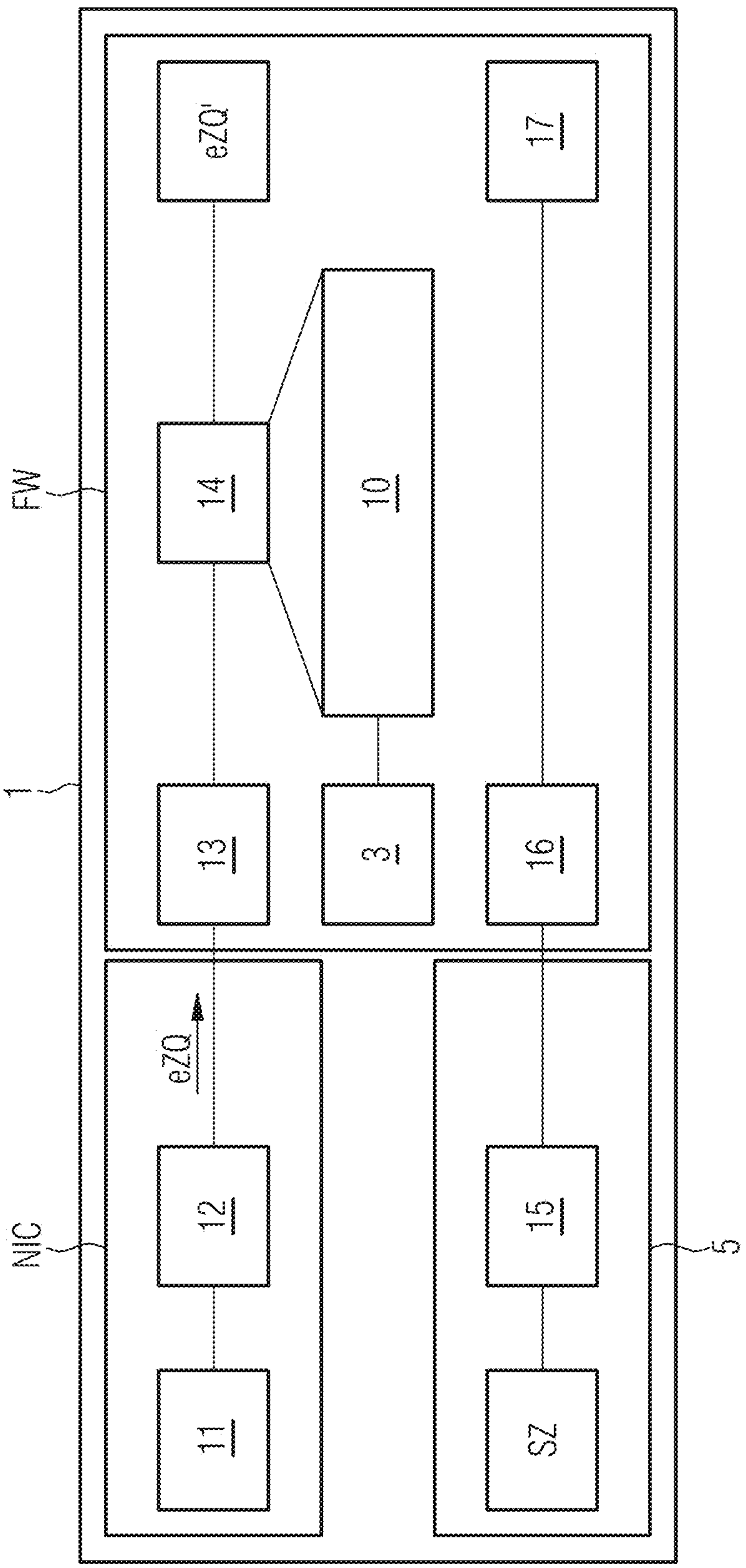
FIG. 4 shows the principle of the access to two different times via the runtime environment in accordance with the invention.

FIG. 4 shows a block circuit diagram for illustration the different time formations. In the runtime environment FW, a system call 13, for example, a Linux SysCall is implemented to the network register of the network card NIC. This system call 13 continuously retrieves the safety time eZQ from the network card NIC. The network card NIC makes a time basis available via a local clock time 11, where this time basis is normalized via a normalization 12 to a normalized 64-bit counter. This 64-bit counter is given in nanoseconds. The random number generator 3 is also implemented in the runtime environment FW. The converter 10 receives the random number ZZ generated by the random number generator 3 and, with the aid of a time converter 14, the random number ZZ is calculated into the time and simultaneously, this calculated time is converted to a standard time of 32.768 kHz. In this way, the safety time eZQ' with the random number ZZ applied to it is obtained. Via a basis timer access 16, the system time SZ of the processor 5 is made available in a conventional manner to the runtime environment FW. Via a divider 15, the system time SZ can be adapted in accordance with the specifications. Ultimately, the time needed for the control of the process is made available to the safety program F-PROG and the user program S-PROG via a standard basis timer 17.

Figure 5:
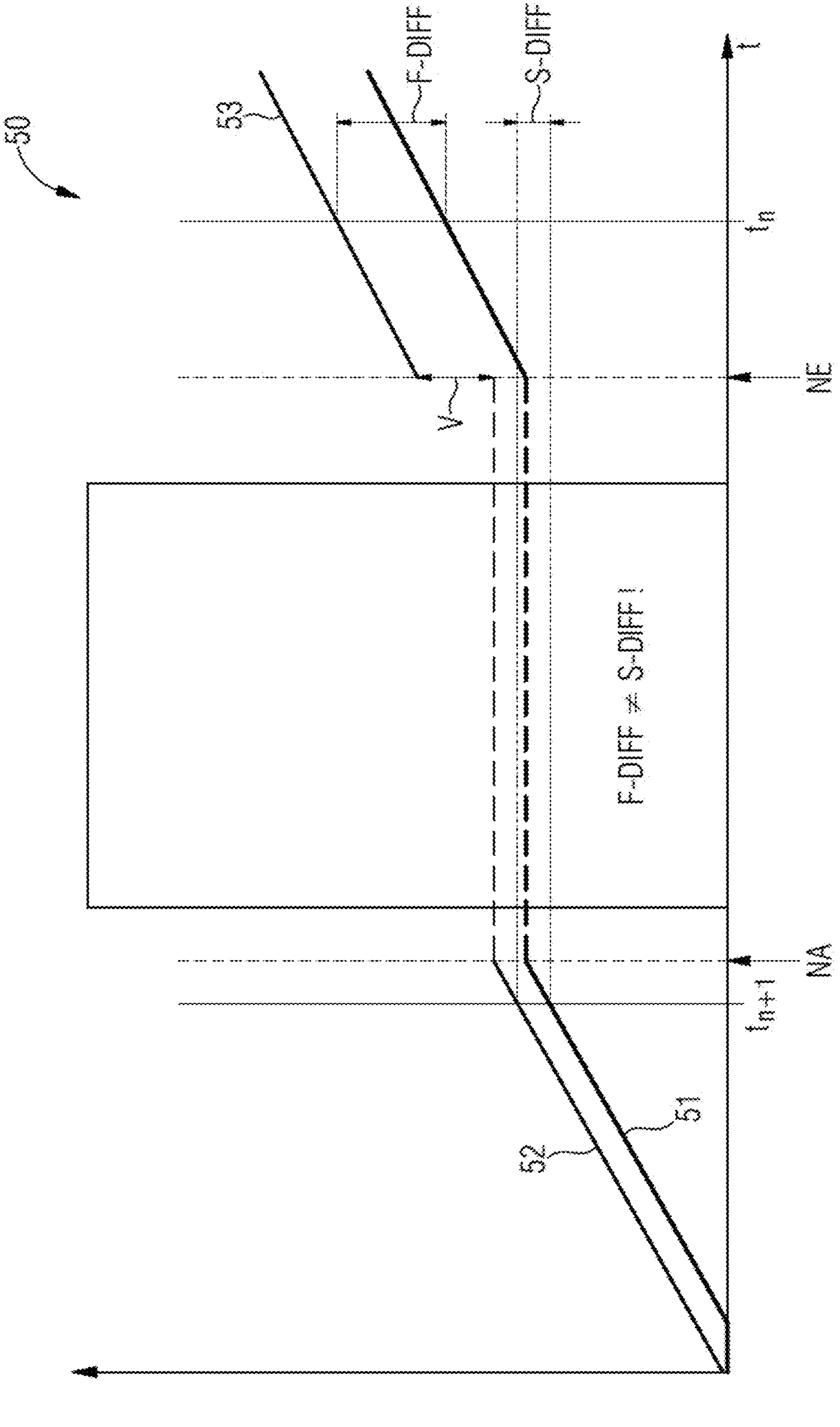
FIG. 5 shows a diagram to illustrate the patterns over time of the system time and the safety time in accordance with the invention.

FIG. 5 shows a diagram 50 of the patterns over time of the system time SZ and the safety time eZQ. At a start time point, the system time SZ, shown via the temporal variation 51 and the safety time eZQ', shown via the temporal variation 52, start running. At a time point NA (mains off), the power fails. In general, a processor and/or its system time SZ is configured so that it is remanent. This means that after the return of the voltage and/or after ending of the power failure, at the time point NE (mains on), the time continues running with the last value. The behavior of the additionally obtained safety time eZQ is not known and/or is typically not remanent. As a result, no defined behavior is obtained and it is not possible to react thereto in a safety-compliant manner. If, at the time point NE (mains on), a cold start of the computer system 1 were to be performed and if, arbitrarily, the cold start mechanism KM was not implemented in the safety program F-PROG, then this would be revealed by an offset V in the time difference F-Diff for the safety time eZQ. The offset V results from the difference between the new random number ZZ-neu and the old random number ZZ-alt.

Figure 6:
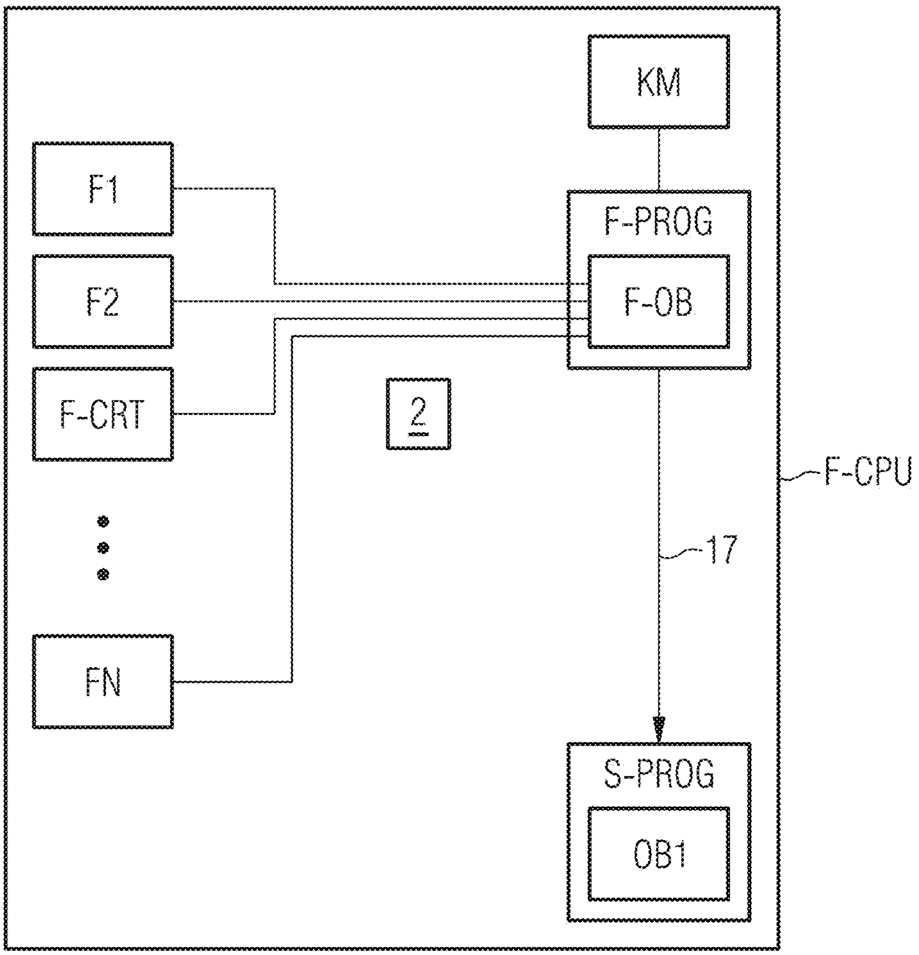
FIG. 6 shows the principle of a fail-safe control system with a possible retrieval sequence in accordance with the invention.

FIG. 6 shows the principle of the start-up upon starting a fail-safe control system F-CPU. Firstly, the cold start mechanism KM is performed. In the cold start mechanism KM, inter alia, user data is deleted and the current process map of the inputs and the current process map of the outputs is deleted. Remanent and non-remanent markers are deleted. Times and counters are deleted. All DBs are initialized with initial values. During this phase, peripheral outputs are switched into a safe state.

During a cold start, it is necessary, in particular, for a fail-safe control system F-CPU, that starting occurs with initial values IW. Thereafter, the actual safety program F-PROG starts from a safety OB, F-OB, different safety components F1, F2, F-CRT . . . to Fn are gradually called. All these safety components provide for the functional safety required of the fail-safe control system F-CPU. In the control component F-CRT, in order to secure the system time SZ to the safety time eZQ, a random number ZZ is added. As such, if the cold start mechanism KM has failed, then calculation occurs later with an old value in the storage region 2 and the failure of the cold start mechanism KM would be revealed. In the safety program F-PROG, in the standard user program S-PROG, a standard basis timer unit 17 is made available for the calling of an OB1.

Figure 7:
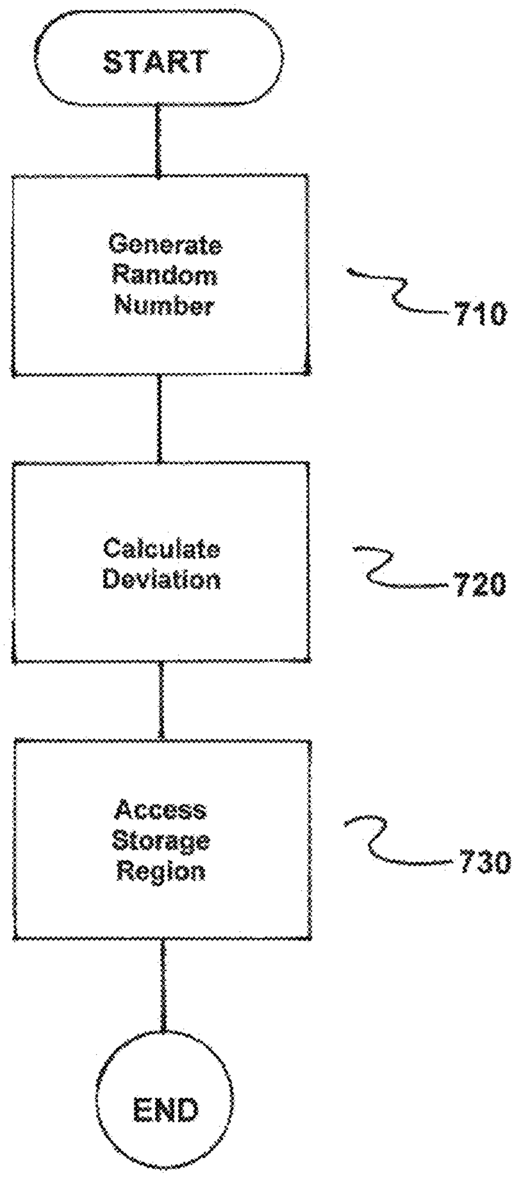
FIG. 7 is a flowchart of the method in accordance with the invention.

FIG. 7 is a flowchart of the method for operating a segment of cycle-oriented control software Soft-PLC for controlling a process, where the control software Soft-PLC executes on a computer system 1 within a runtime environment FW, in order to secure the system time SZ of the computer system 1, a further safety time eZQ independent of the system time SZ is requested in each cycle Z, a first time difference S-Diff is formed from the system time SZ of a current cycle Zn and the system time SZ of a previous cycle Zn−1 and a second time difference F-Diff is formed from the safety time eZQ of the current cycle Zn and the safety time eZQ of the previous cycle Zn−1 and a comparison of the first and second time differences S-Diff, F-Diff with a predetermined tolerance TOL is performed and, in an event the deviation of the time differences S-Diff, F-Diff exceeds the tolerance TOL, an error signal is generated.

The method comprises generating a random number ZZ upon a start-up of the runtime environment FW, as indicated in step 710. In accordance with the method, the generated random number ZZ is stored in a storage region 2 and added to the storage region 2 upon every further request for the safety time eZQ.

Next, a deviation between the time differences S-Diff, F-Diff, is calculated in a control component F-CRT at the start of a new cycle Zn in the control software Soft-PLC, as indicated in step 720.

Next, the storage region 2 is accessed by the control component F-CRT during each new cycle Zn, as indicated in step 730. Here, the random number ZZ is subtracted out of the safety time eZQ in the control component F-CRT again before the calculation of the time differences S-Diff, F-Diff, for the eventuality that a new start-up of the runtime environment FW has occurred, where the new start-up of the runtime environment FW is diagnoseable based on the tolerance TOL being exceeded, because the second time difference F-Diff has an offset V that is given by the safety time eZQ with a new random number ZZ of the current cycle Zn and the safety time eZQ with the old random number ZZ of the previous cycle Zn−1.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps that perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for operating a segment of cycle-oriented control software for controlling a process, the control software executing on a computer system within a runtime environment, in order to secure a system time of the computer system, a further safety time independent of the system time being requested in each cycle, a first time difference being formed from the system time of a current cycle and the system time of a previous cycle and a second time difference being formed from the safety time of the current cycle and the safety time of the previous cycle and a comparison of the first and second time differences with a pre-determined tolerance being performed and, in an event the deviation of the time differences exceeds the tolerance, an error signal being generated, the method comprising:

generating a random number upon a start-up of the runtime environment, the generated random number being stored in a storage region and added to the storage region upon every further request for the safety time;

calculating, in a control component, a deviation between the time differences at a start of a new cycle in the control software; and accessing, during each new cycle, the storage region by the control component, the random number being subtracted out of the safety time in the control component again before the calculation of the time differences, for an eventuality that a new start-up of the runtime environment has occurred, the new start-up of the runtime environment being diagnoseable based on the tolerance being exceeded, and the second time difference having an offset which is given by the safety time with a new random number of the current cycle and the safety time with the old random number of the previous cycle.

2. The method as claimed in claim 1, wherein the control software is operated as a fail-safe control system with a safety program and a standard user program and unwanted influencing of the safety program is revealable.

3. The method as claimed in claim 2, wherein a cold start mechanism is performed on the computer system during a start-up of the fail-safe control system after a power failure such that the cold start mechanism ensures the start-up always occurs with initial values and not with current values of the last cycle; wherein in an event that the cold start mechanism has failed, this failure is recognized during a difference calculation in the control component via an exceeding of the tolerance, such that a failure of the cold start mechanism is recognized.

4. The method as claimed in claim 1, wherein the safety time is read out by a hardware component installed in the computer system.

5. The method as claimed in claim 2, wherein the safety time is read out by a hardware component installed in the computer system.

6. The method as claimed in claim 3, wherein the safety time is read out by a hardware component installed in the computer system.

7. The method as claimed in claim 4, wherein the hardware component comprises a network card.

8. The method as claimed in one of claim 1, wherein after the request for the safety time to an integer value, and a standard frequency of 32.768 kHz is replicated.

9. A computer system comprising:

a runtime environment configured to cause a segmented of cycle-oriented control software to execute to control a process;

a random number generator;

a processor with a system time;

a hardware component with an external time source for providing a safety time;

a storage region;

wherein the computer system is configured to:

generating a random number upon a start-up of the runtime environment, the generated random number being stored in a storage region and added to the storage region upon every further request for the safety time;

calculating, in a control component, a deviation between the time differences at a start of a new cycle in the control software; and accessing, during each new cycle, the storage region by the control component, the random number being subtracted out of the safety time in the control component again before the calculation of the time differences, for an eventuality that a new start-up of the runtime environment has occurred, the new start-up of the runtime environment being diagnoseable based on the tolerance being exceeded, and the second time difference having an offset which is given by the safety time with a new random number of the current cycle and the safety time with the old random number of the previous cycle.

10. The computer system as claimed in claim 9, wherein the computer system is configured as one of a multifunctional control platform, an industry PC, an edge computing platform and a cloud computing platform.

11. The computer system as claimed in claim 9, wherein the control software has a fail-safe control system with a safety program and a standard user program.

12. The computer system as claimed in claim 10, wherein the control software has a fail-safe control system with a safety program and a standard user program.

13. The computer system as claimed in claim 9, wherein the fail-safe control system has a cold start mechanism which is configured to perform a start-up of the fail-safe control system after a power failure on the computer system; and wherein the cold start mechanism is configured to pre-configure the fail-safe control system with initial values and not with current values of the last cycle, the computer system further comprising a control component configured to recognize a failure of the cold start mechanism via a difference calculation based on exceeding the tolerance.

14. The computer system as claimed in claim 10, wherein the fail-safe control system has a cold start mechanism which is configured to perform a start-up of the fail-safe control system after a power failure on the computer system; and wherein the cold start mechanism is configured to pre-configure the fail-safe control system with initial values and not with current values of the last cycle, the computer system further comprising a control component configured to recognize a failure of the cold start mechanism via a difference calculation based on exceeding the tolerance.

15. The computer system as claimed in claim 11, wherein the fail-safe control system has a cold start mechanism which is configured to perform a start-up of the fail-safe control system after a power failure on the computer system; and wherein the cold start mechanism is configured to pre-configure the fail-safe control system with initial values and not with current values of the last cycle, the computer system further comprising a control component configured to recognize a failure of the cold start mechanism via a difference calculation based on exceeding the tolerance.

* * * * *